US006517961B1

(12) United States Patent
Agata et al.

(10) Patent No.: US 6,517,961 B1
(45) Date of Patent: Feb. 11, 2003

(54) ELECTROSTATIC CHARGE REGULATOR, METHOD FOR MAKING SAME, AND IMAGE FORMING METHOD USING SAME

(75) Inventors: Takeshi Agata, Minamiashigara (JP); Noriaki Yamazaki, Minamiashigara (JP); Kei Shimotani, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 192 days.

(21) Appl. No.: 09/603,841

(22) Filed: Jun. 26, 2000

(30) Foreign Application Priority Data

Jul. 6, 1999 (JP) .......................................... 11-192272

(51) Int. Cl.[7] ............................ B32B 9/00; B32B 15/04

(52) U.S. Cl. ....................... 428/702; 428/469; 428/697; 428/701; 430/111.1; 430/111.32; 430/111.35

(58) Field of Search ................................ 428/469, 697, 428/701, 702, 195, 204; 430/111.1, 111.32, 111.35

(56) References Cited

U.S. PATENT DOCUMENTS 4,719,064 A * 1/1988 Nakata et al.

* cited by examiner

*Primary Examiner*—Deborah Jones
*Assistant Examiner*—Jennifer McNeil
(74) *Attorney, Agent, or Firm*—Oliff & Berridge, PLC

(57) ABSTRACT

An electrostatic charge regulator capable of holding an electric charge in a stable state and superior in environmental stability, as well as a method for making the electrostatic charger regulator and an image forming method using the electrostatic charge regulator, are disclosed. The electrostatic charge regulator has a surface layer containing a non-linear resistor on a base member such as a carrier, a developer sleeve, a developer blade, or a transfer belt. The electrostatic charge regulator is obtained by forming on the base member a surface layer by using a thin film of a composite metal oxide or by using dispersion of powder of the composite metal oxide in a high molecular compound, the composite metal oxide being prepared using at least one metal selected from Group A metals (Zn, Ti, Si, Al, Zr) and at least one metal selected from Group B metals (Bi, Sb, C, Y, La, Pr, Sc, Ce, Sn, Pb). The image forming method uses the above electrostatic charge regulator to form an image.

8 Claims, 2 Drawing Sheets

ELECTROSTATIC CHARGE REGULATOR, METHOD FOR MAKING SAME, AND IMAGE FORMING METHOD USING SAME

BACKGROUND OF THE INVENTION

1. Field of the Invention

The present invention relates to an electrostatic charge regulator useful, for example, as an electrophotographic material or an electrostatic printing material, as well as a method for making the same and an image forming method using the same.

2. Description of the Related Art

Heretofore, as techniques which positively utilize an electric charge induced by static electricity there have been known such electrostatic recording techniques as electrophotography and electrostatic printing. In the electrostatic recording method, at the time of developing a formed electrostatic charge latent image, there is used a charging member for imparting an appropriate amount of a positive or negative electric charge to colored fine particles called toner.

Particularly, in the electrophotographic method as an electrostatic recording method, which utilizes an electrostatic charge induced by frictional charging, there can be made a broad classification into a dual-component developing method and a mono-component developing method according to charging mechanisms used. The dual-component developing method uses what is called a carrier coated with a resin and capable of imparting a frictional charge to various electrically conductive, fine particulate toners. On the other hand, the mono-component developing method uses what is called a sleeve or a blade formed by coating an electrically conductive, cylindrical base or thin plate with a resin or the like in the same manner as above.

However, a problem has been encountered in utilizing such a frictional charge. More particularly, in case of creating an electric charge by frictional charging with use of the foregoing charging member, there occurs a phenomenon such that the electric charge created is too low or too high, depending on the type of the coating resin used as the charging member or depending on the charging environment. Due to such a phenomenon, an electrostatic charge latent image formed cannot be reproduced accurately and an image which is rendered visible becomes worse. Moreover, in the method wherein an electric charge is generated by frictional charging, there is a fear that the coated resin layer may be peeled off by friction or the surface thereof may be stained, thus giving rise to the same phenomenon as above.

In the above electrostatic recording methods, also as to a transfer member to be used in the process of transferring the toner onto paper and making an image visible, thin polymer films with controlled resistance have recently been used to match the recent simplification of the apparatus concerned.

Such thin polymer films contain a resistance regulating material such as carbon black in a dispersed state for controlling resistance, which material, however, is a low resistance material for obtaining a desired resistance value, so that there occurs an intra-surface unevenness in resistance, depending on the state of dispersion of the material, with consequent deterioration of reliability.

In an effort to solve the above-mentioned problems, various resins and additives for use in the charging member have so far been studied in connection with the dual-component developing method in electrophotography. For example, there are proposed carriers coated with resins containing fluorine polymers as in Japanese Published Unexamined Patent Application Nos. Sho 49-51950, Sho 57-99653, and Sho 60-202451, containing silicone polymers as in Japanese Published Unexamined Patent Application Nos. Sho 60-19156, Sho 62-121463, Sho 61-110159, and Sho 61-110160, or containing silicone oils as in Japanese Published Unexamined Patent Application Nos. Hei 3-46669, Hei 3-46670, Hei 3-46671, and Hei 5-72814.

However, the abrasion resistance of the resin coatings is insufficient, an initial charging value varies largely at high temperature and high humidity or at low temperature and low humidity, there occurs an expansion in charge distribution of the toner used, particularly, the amount of an electric charge decreases at high temperature and high humidity or increases to an extreme extent at low temperature and low humidity. Thus, as to environmental stability, there still remains room for improvement.

Also with respect to the electrostatic recording method, studies are being made about the mono-component developing method not using a carrier as the charging member in view of the recent tendency to the reduction in size, which method utilizes friction with a blade or a sleeve for charging a toner used. However, the blade or sleeve is kept in friction with the toner, so also for such blade or sleeve it is important to hold an appropriate amount of an electric charge over a long period as is the case with the foregoing dual-component developing method. For example, in Japanese Published Unexamined Patent Application No. Hei 3-204664 there is used a curable fluorine-containing copolymer as the material of a developing roller. But this roller is deficient in its power of charging a toner, thus giving rise to the problem that an image having been rendered visible is deteriorated.

As to the foregoing transfer member, there has been made an attempt of using a homogeneous, electrically conductive, high molecular compound for solving the above-mentioned problems, as is described, for example, in Japanese Published Unexamined Patent Application No. Hei 9-90776. But also in this case a problem is encountered in point of environmental stability of the electrically conductive polymer. Particularly, the collapse of a transferred image has been unavoidable at high temperature and high humidity and at a reduced resistance.

SUMMARY OF THE INVENTION

The present invention has been accomplished in view of the above-mentioned problems involved in the related art and provides an electrostatic charge regulator capable of holding a desired electric charge stably in any of the above techniques which utilize an electrostatic charge, as well as a method for making the electrostatic charge regulator and an image forming method which uses the electrostatic charge regulator and which can form a stable image in good environmental stability while holding an electric charge stably.

According to the present invention, the foregoing problems can be solved by the following configuration.

The electrostatic charge regulator according to the present invention is characterized by having a base member and a surface layer, the surface layer containing a non-linear resistor.

The method for making the electrostatic charge regulator according to the present invention is characterized in that the surface layer is formed by forming a thin film of a composite metal oxide on the base member or by using dispersion of powder of the composite metal oxide in a high molecular compound, the composite metal oxide being prepared by using at least one member selected from Group A metals (Zn, Ti, Si, Al, Zr) and at least one metal selected from Group B metals (Bi, Sb, C, Y, La, Pr, Sc, Ce, Sn, Pb).

The image forming method according to the present invention is characterized by using the electrostatic charge regulator.

The electrostatic charge regulator according to the present invention is characterized by being used for toner.

In the electrostatic charge regulator according to the present invention, a non-linear resistor is contained in the surface layer and a threshold voltage of the non-linear resistor exerts a great influence on the characteristics of the regulator and also influences an insulator surface on which an electrostatic charge is generated, whereby the amount of an electric charge on the insulator surface can be adjusted.

In the method for making the electrostatic charge regulator according to the present invention, the surface layer is formed on the base member by using a combination of a Group A metal with a Group B metal and, if necessary, other metals, and there is obtained a non-linear resistor having a desired threshold voltage by the method of making.

In the image forming method according to the present invention, if there is used the electrostatic charge regulator having the surface layer containing the non-linear resistor and formed on a carrier, a developer sleeve, a developer blade, or a transfer belt, as the base member, then the amount of an electric charge in each layer is held stably and there occurs no image deterioration.

BRIEF DESCRIPTION OF THE DRAWINGS

Preferred embodiments of the present invention will be described in detail based on the followings, wherein.

DETAILED DESCRIPTION OF A PREFERRED EMBODIMENT

Figure 1:
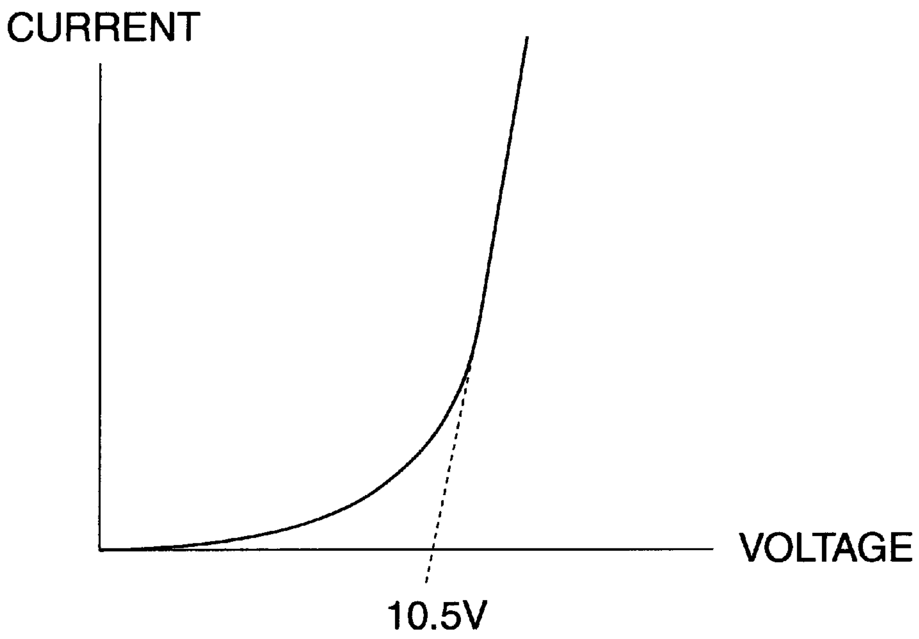
FIG. 1 is a graph showing the results of having measured the amount of regulated charge transfer with use of an electrostatic charge regulator (a carrier for electrophotography) obtained in Example 1.

The electrostatic charge regulator according to the present invention has a base member and a surface layer, the surface layer containing a non-linear resistor. The base member indicates a base member which is required to be regulated its amount of an electrostatic charge in, for example, an electrophotographic method or an electrostatic printing method. As examples of the base member there are mentioned a carrier which is for imparting a frictional charge to an electrically conductive fine particulate toner used in the dual-component developing method in electrophotography, a developer sleeve or a developer blade used in the mono-component developing method, and an electrophotographic transfer member such as a transfer belt.

In the electrostatic charge regulator according to the present invention, the surface layer formed on the base member exemplified above contains a non-linear resistor. The non-linear resistor indicates a resistor whose electric resistance varies non-linearly against an applied voltage. This resistor has heretofore been known as varistor. The non-linear resistor used in the present invention preferably possesses a characteristic such that an electric current is difficult to flow in a low voltage region, while at a certain voltage or more there suddenly occurs a change into a low resistance, allowing a large current to flow.

Further, it is preferable that the non-linear resistor used in the present invention exhibit a threshold voltage of about 1.0 to 20,000 V, more preferably about 1.0 to 400 V, as measured in accordance with the following measuring method.

<Measuring Method>

A dispersion prepared from the non-linear resistor, a resin, and a solvent, or a solution prepared from a precursor of the non-linear resistor and a solvent, having the same composition as that of the surface layer, is applied onto an aluminum plate to form a thin film having a dry thickness of about 50 $\mu$m and a gold electrode is formed on the thin film surface by vapor deposition to afford a guard electrode aluminum plate. Then, platinum wire is attached to the aluminum plate and voltage is applied. In this state a change in electric current is measured.

A threshold voltage (operating voltage) is determined from the voltage-current relation.

The amount of an electric charge of a toner used in electrophotography is ten volts to several ten volts, (1 V is required even as minimum), in terms of a voltage applied to the surface layer of a carrier or a blade. Thus, the threshold voltage determined by such a measuring method is required to be 1 V or more. On the other hand, in case of an electrostatic charge regulator having a surface layer which contains a non-linear resistor whose threshold voltage (operating voltage) exceeds about 400 V, there may occur a gas discharge between the regulator and another member and the residual electric charge assumes a state in which both plus and minus are mixed together. In such a state it is impossible to effect destaticizution into a uniform quantity of an electric charge. Thus, when the voltage is to be reduced, it suffices for the threshold voltage (operating voltage) of the non-linear resistor to be in the range of about 0.1 V to 20,000 V, but for obtaining a certain level of an electric charge it is preferable to use a non-linear resistor which exhibits a threshold voltage (operating voltage) of about 1.0 to 400 V in the air.

As an example of the non-linear resistor exhibiting the above characteristic there is mentioned a composite metal oxide prepared from at least one metal selected from Group A metals shown in Table 1 below, at least one metal selected from Group B metals shown in the same table, and at least one metal selected from Group C metals shown in the same table. The threshold voltage (operating voltage) in the non-linear resistor depends not only on the combination of the above metals but also on manufacturing conditions for the composite metal oxide.

TABLE 1

| Group A Metals | Group B Metals | Group C Metals |
|---|---|---|
| Zn | Bi | Mg |
| Ti | Sb | Ca |
| Si | C | Sr |
| Al | Y | Ba |
| Zr | La | Co |
| | Pr | Mn |
| | Sc | Ni |
| | Ce | Cu |
| | Sn | Fe |
| | Pb | V |

As the composite metal oxide contained in the surface of the electrostatic charge regulator according to the present invention, a composite metal oxide prepared from a combination of Zn, Ti and Si selected from Group A metals with Bi, Y, Pr, C, and La selected from Group B metals, and, if necessary, further with Ba, Mn, Co, Cu, and Ni selected from Group C metals, is preferred in view of its characteristics that the threshold voltage thereof is in the range of about 1.0 V to 400 V and that the rise of voltage is abrupt.

The composite oxide used in the present invention can be prepared by any of the following known methods.

Where the composite metal oxide is to be prepared in a powdery form, it is useful to adopt a conventional method of making a varistor which is well known as a non-linear resistor. For example, there may be adopted the method disclosed in Japanese Published Unexamined Patent Application No. Hei 3-165503. According to this method, an oxide of a metal selected from Group A metals and an oxide of a metal selected from Group B metals, and, if necessary, an oxide of a metal selected from Group C metals, all in a powdery form, are mixed together at a predetermined ratio, followed by sintering at a high temperature and subsequent pulverization, to afford a composite metal oxide having predetermined proportions of the constituent metal oxides.

As another method there may be adopted the method disclosed in Japanese Published Unexamined Patent Application No. Hei 6-260304. According to this method, an oxide of a metal selected from Group A metals and an oxide of a metal selected from Group B metals, and, if necessary, an oxide of a metal selected from Group C metals, all in a powdery form, are mixed together at a predetermined ratio, then an organic binder, a surfactant, and water are added. After through mixing, the resulting mixture is made into fine particles by means of a spray dryer. The fine particles are then sintered at a high temperature to remove organic matters completely, whereby there can be obtained a composite metal oxide having predetermined proportions of the metal oxides.

The composite metal oxide can be obtained also by the steps of melt-mixing metallic salts, e.g., chlorides, of metals selected from Group A and B metals and, if necessary, a metal selected from Group C metals, at a predetermined ratio, then adding an organic acid such as oxalic acid to give a coprecipitated compound, subsequent sintering to volatilize and decompose organic matters, and subsequent pulverization.

In addition to the above methods there recently has been proposed such a method as is described in Nikkei Science March 1997 Number, pp.88–95. According to this method, plural metals are subjected to evaporation in an oxygen atmosphere to afford composite metal oxide particles, which particles may be used in the present invention.

In the composite metal oxide particles thus obtained, the proportions of metal oxides of Group A, B and C metals are preferably such that the proportion of Group A metal oxide is about 99.9 to 50.0 mol % and the proportion of each of Group B and C metal oxides is about 0.01 to 50 mol %. If the metal oxide proportions are outside these ranges, an increase of the threshold voltage is apt to occur and it may become difficult to keep the electrostatic charge stable.

More preferably, the proportion of Group A metal oxide is about 99.9 to 70 mol % and the proportion of each of Group B and C metal oxides is about 0.01 to 30 mol %.

In preparing the electrostatic charge regulator with use of the composite metal oxide powder there may be used a high molecular compound as a binder and the composite metal oxide powder may be dispersed therein. As the high molecular compound there may be used, for example, any of polyester resins, acrylic resins, polyamide resins, and polycarbonate resins.

For dispersing the composite metal oxide in the high molecular compound there may be adopted, for example, a method wherein the high molecular compound and the composite metal oxide are melt-mixed together with use of a mechanical force such as an extruder and the resulting dispersion is used in film formation or coating, or a method wherein the high molecular compound is dissolved in a solvent capable of dissolving the compound, then the composite metal oxide is added and dispersed using a dispersing machine such as a sand mill, and the resulting dispersion is coated onto a base member or the like. A suitable method may be selected according to the shape of the regulator to be obtained.

The composite metal oxide powder necessary for preparing the electrostatic charge regulator and the high molecular compound used as a binder are used in a ratio such that the proportion of the composite metal oxide powder is in the range of about 90 to 1.0 wt %, preferably about 90 to 10 wt %, relative to the total solids content, though it differs depending on the amount of an electric charge to be regulated.

In the case where the composite metal oxide having the above predetermined components' ratio is used as a thin film, the thin film may be formed, for example, by the method described in Japanese Published Unexamined Patent Application No. Hei 5-299208 wherein organometallic compounds are mixed according to the composition of the composite metal oxide having the above predetermined ratio (for example, respective metal alkoxides or organometallic compounds associated with the composite metal oxide are mixed at a predetermined ratio) and thereafter the resulting mixture is applied onto a base member, followed by sintering under heating at about 300° to 1,200° C.

Such materials used in forming a thin film of the composite metal oxide are those well known as chelate compounds such as alkoxides, organic acid salts, and acetylacetonates, which are prepared from Group A, B and C metals shown in the foregoing table. All of these compounds are empolyable insofar as they dissolve in organic solvents. These compounds are mixed together in a predetermined ratio.

Chelate compounds such as metal alkoxides, organic acid salts, or acetylacetonates of Group A, B and C metals in the foregoing table are used in a ratio such that the proportion of the Group A metal chelate compound is preferably in the range of about 99.9 to 50.0 mol %, more preferably about 99.9 to 70 mol %, and that of the Group B and C chelate compounds is preferably about 0.01 to 50 mol %, more preferably about 0.01 to 30 mol %. If the proportions of those compounds are outside the above ranges, there will occur an increase of the threshold voltage.

As an example of the electrostatic charge regulator using the composite metal oxide according to the present invention there is mentioned a carrier for electrophotography. In this case, the composite metal oxide may be in the form of a powder or a thin film.

In this case, as a core material to be coated with the composite metal oxide there may be used, for example, any of such magnetic metal powders as iron, copper, nickel, and cobalt powders having an average particle diameter of 10 to 150 $\mu$m, as well as these magnetic metal powders coated with resin, further, such magnetic oxide powders as magnetite and ferrite, as well as these magnetic oxide powders coated with resin. The amount of coating of the composite metal oxide is usually in the range of about 0.1 to 10 wt %, preferably 0.5 to 8.0 wt %, relative to the core material.

As a method for coating the surface of the core material with the composite metal oxide there may be adopted any of such known methods as a dipping method wherein a core material powder is dipped into a coating layer forming solution, a spray method wherein the coating layer forming solution is sprayed onto the surface of the core material, a fluidized bed method wherein the coating layer forming solution is sprayed to the core material while the core material is kept suspended by flowing air, and a kneader/coater method. In this case, it is optional whether the composite metal oxide is to be used as a powder or a thin film. The composite metal oxide in a powdery form is used as a dispersion thereof in the foregoing polymeric binder or as a mixed powder, and any of the above known techniques is applied thereto.

In the case where the surface layer is in the form of a thin film, chelate compounds of the constituent metals of the composite metal oxide, such as alkoxides, organic acid salts, or acetylacetonates, capable of being dissolved in organic solvents, are used and coating is performed in the same way as above, followed by sintering at a temperature of about 150° C. to 200° C., whereby there is formed a thin film of the composite metal oxide.

Further, if a layer of the composite metal oxide is formed on the surface of an electrically conductive base member, the thus-coated base member can be used as a developer sleeve for electrophotography. As examples of the electrically conductive base member there are mentioned aluminum and stainless steel. For forming a layer of the composite metal oxide on the base member there may be adopted, for example, a dipping method wherein the electrically conductive base member is dipped into a coating layer forming solution, or a spray method wherein the coating layer forming solution is sprayed onto the surface of the electrically conductive base member. The coating operation may be performed in the same manner as in the formation of the electrophotographic carrier described above.

In case of such a developer sleeve for electrophotography, the thickness of the coating layer is usually in the range of about 1 to 500 μm, preferably about 5 to 300 μm. For the purpose of resistance control, a resistance controlling agent such as carbon black, tin oxide, or titanium oxide, may be incorporated in the coating layer.

The composite metal oxide is also employable as a transfer member for electrophotography.

For preparing a transfer member for electrophotography there may be adopted, for example, a method wherein the powder of the composite metal oxide is kneaded a predetermined amount with a polymeric binder such as a polyimide resin, a polyamide resin, or a polyamic acid resin, followed by extrusion and stretching into a filmy form, or a method wherein a thin film is formed in the foregoing ratio onto a polymeric or metallic thin film by vacuum deposition for example.

The thickness of the film formed is in the range of about 10 mm to 10 μm, and in the formation of a film by extrusion and stretching, the composite metal oxide powder and the polymeric binder are used in a ratio such that the proportion of the composite metal oxide powder is preferably in the range of about 90 to 1.0 wt % relative to the total solids content, although this differs depending on the amount of an electric charge regulated.

Further, the toner used in combination with the electrophotographic charging member, carrier, and developer sleeve in the present invention is made up of colored particles of at least a binding resin and a colorant. As the binding resin there may be used, for example, any of styrene resins, (meth)acrylic ester resins, styrene-butadiene resins, polyester resins, urethane resins, and amide resins. As the colorant for use in preparing the toner there may be used any of known colorants such as black colorants, e.g., carbon black, and organic pigments, e.g., C.I. Pigment Blue 15:1, C.I. Pigment Blue 15:2, C.I. Pigment Blue 15:3, C.I. Pigment Yellow 12, C.I. Pigment Yellow 13, C.I. Pigment Yellow 14, C.I. Pigment Yellow 17, C.I. Pigment Red 57:1, and Pigment Red 122.

EXAMPLES

The present invention will be described below in detail by way of Examples.

Electrostatic Charge Regulator Example 1

Carrier for Electrophotography 1

Zn and Bi were selected respectively from Group A and B metals shown in the foregoing table and about 200 g (about 2.5 mol) of ZnO and about 11.7 g (about 0.25 mol) of $Bi_2O_3$ were weighed so as to give an oxides mixing molar ratio of 99/1. Both oxides were then mixed together for about five hours by means of a ball mill, then the resulting mixture was sintered temporarily at about 700° C., followed by milling with a hammer mill and subsequent further sintering at about 1,000° C. The sintered product was then hammer-milled coarsely and thereafter ball-milled finely for about 20 hours to afford a composite metal oxide having a predetermined component ratio.

Separately, a solution of about 90 g polymethyl methacrylate (molecular weight: about 100,000) in about 1,200 g toluene was prepared, into which was then added about 81.0 g of the composite metal oxide prepared above. Then, with a sand mill (Batch Sand, a product of Kansai Paint Co., Ltd.) using about 1,000 g of glass beads each 1 mm in diameter, agitation was conducted at high speed for three hours, allowing the composite metal oxide to be dispersed, to afford a dispersion of the composite metal oxide in the polymeric binder. The proportion of the composite metal oxide in the dispersion was found to be about 47.4 wt % relative to the total solids content. Then, using an applicator, the dispersion thus prepared was applied onto an aluminum plate in the form of a thin film having a thickness of about 50 μm and a gold electrode was formed on the thin film surface by vapor deposition to afford a guard electrode aluminum plate, to which was then attached platinum wire. Voltage was then applied and a change in electric current was checked, affording the results shown in FIG. 1. According to this measuring method, a threshold voltage (operating voltage) of the non-linear resistor was about 10.5 V.

Figure 2:
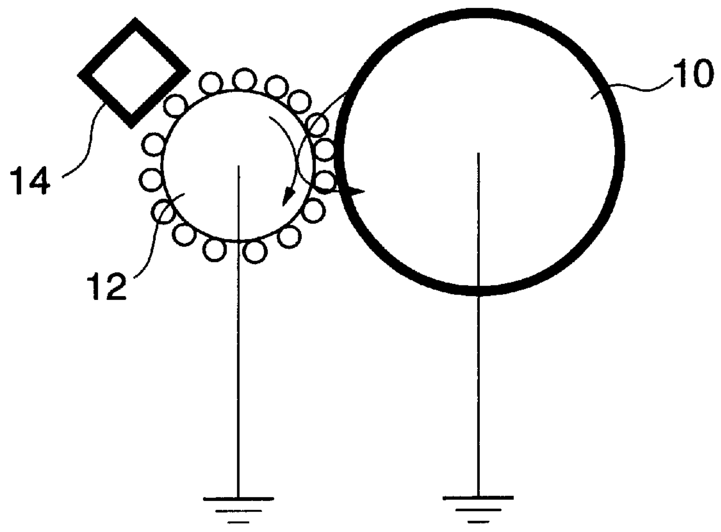
FIG. 2 is an explanatory diagram showing a method for measuring the amount of an electric charge.

Whether or not the composite metal oxide dispersion having such a non-linearity acts as an electrostatic charge regulator was checked using the apparatus shown in FIG. 2. More particularly, a drum 10 shown in FIG. 2 was coated with the composite metal oxide dispersion and a surface potential of a resin-coated powder on a sleeve 12 was measured by means of a surface electrometer 14, the sleeve 12 being in contact with the drum 10 and rotating at the same surface speed as the drum.

Magnetic Brush of Resin-coated Powder:

Polymethyl methacrylate was coated about 2.0 wt % onto a Cu—Zn ferrite having an average particle size of about 50 μm.

Drum Coated with Non-linear Composite Metal Oxide:

The dispersion prepared in Example 1 was coated about 10.0 μm thick onto the drum.

Rotational Peripheral Speed of the Drum and the Magnetic Brush:

about 90 mm/s

Figure 3:
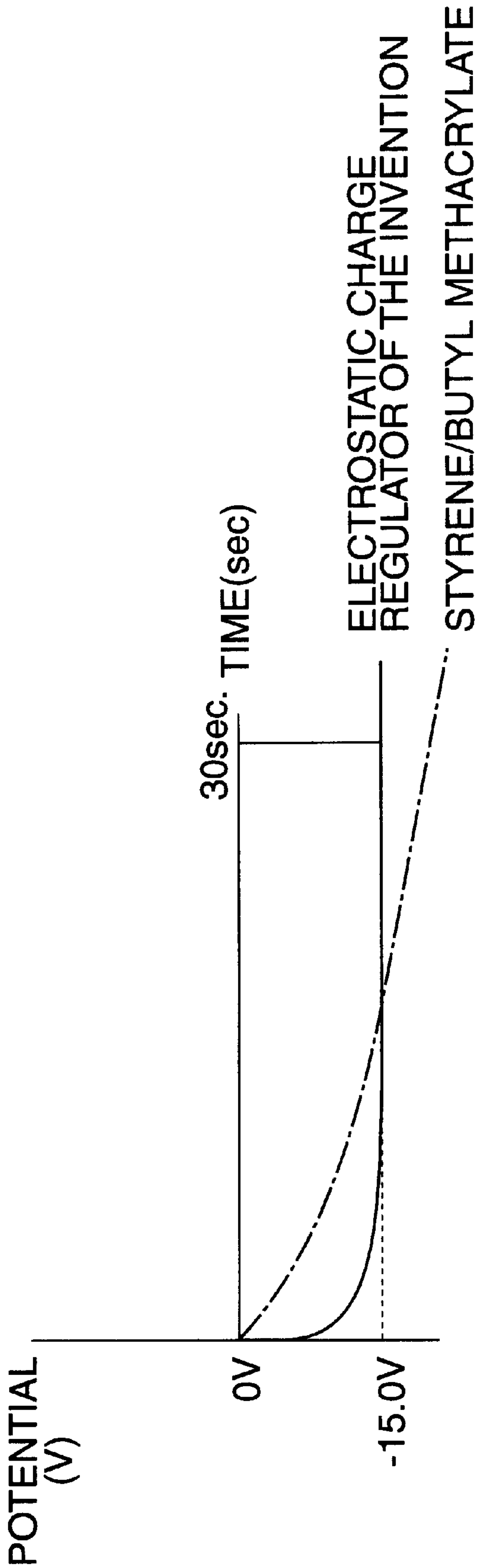
FIG. 3 is a graph showing changes with time in surface potential of a drum coated with a non-linear composite oxide and of a conventional coated drum.

The results of having made measurement with use of this apparatus are shown in FIG. 3, from which it is seen that the surface potential of the drum coated with the non-linear composite metal oxide became constant at about −15.0 V. In contrast therewith, the potential of styrene/n-butyl methacrylate used as a control did not become constant, proving that the electrostatic charge regulator prepared according to the present invention has a function of keeping an electrostatic charge constant.

About 71.0 g of the composite metal oxide dispersion having non-linearity and about 1,000 g of Cu—Zn ferrite particles having an average particle diameter of 50 μm were mixed together at about 50° C. for about 30 minutes within a 1L small-sized kneader provided with a heater, followed by further mixing under a reduced pressure for one hour, to afford a carrier for electrophotography having a film thickness of about 0.83 μm.

Electrostatic Charge Regulator Example 2

Carrier for Electrophotography 2

Zn, Y, and Mn were selected from Group A, B, and C metals, respectively, in the foregoing table so as to be in a molar ratio of 90/5/5 and were then evaporated in an oxygen atmosphere with reference to the method described in Nikkei Science March 1997 Number, pp.88–95 to prepare composite metal oxide particles having an average particle diameter of about 30 nm. Then, a dispersion was prepared in the same way as in Example 1 except that the composite metal oxide particles just prepared above were used and that the polymethyl methacrylate used in Example 1 was substituted by an N,N-dimethylaminoethyl methacrylate/2-perfluorooctylethyl methacrylate (80/20) copolymer. Using this dispersion, there was obtained a voltage element having a current-voltage characteristic (threshold voltage) of about 50 V and exhibiting non-linearity. Subsequently, an electrostatic charge regulator test was conducted in the same manner as in Example 1 to find that the voltage element functioned at about −20 V. Then, using Cu—Zn ferrite particles having an average particle diameter of about 50 μm as a core material, there was prepared a carrier for eletrophotography having a film thickness of about 0.83 μm in the same way as in Example 1.

Electrostatic Charge Regulator Example 3

Carrier for Electrophotography 3

About 164 g (0.5 mol) of tetramethoxytitanium, about 21.4 g (about 50 mmol) of tri-n-butoxybismuth, and about 1.1 g (about 10 mmol) of magnesium ethoxide as alkoxides of Group A titanium, Group B bismuth, and Group C magnesium, respectively, in the foregoing table were weighed and were dissolved and mixed in about 200 ml of ethyl alcohol under heating in a current of nitrogen gas. The resulting precursor solution was applied onto a stainless steel plate in the same way as in Example 1 to form a thin film having a thickness of about 50 μm, followed by sintering at about 600° C. in an electric furnace. As a result, there was obtained a thin film having a Ti/Bi/Mg molar ratio of 89.3/8.93/1.77 as a composite metal oxide. This thin film was measured for current-voltage characteristic in the same manner as in Example 1 to find that the resultant electrostatic charge regulator exhibited non-linearity at about 30 V (threshold voltage).

The non-linear element thus obtained was then subjected to the same electrostatic charge regulator test as in Example 1 and was found to function at about −12 V. Then, based on about 100 parts by weight of Cu—Zn ferrite particles having an average particle diameter of about 50 μm as a carrier core, about 2.7 g of the above precursor solution (solids weight in the solution: about 1.5 parts by weight) and about 30 g of ethyl alcohol were added to the carrier core, followed by mixing in a 1L small-sized kneader equipped with a heater at about50° C. for about 30 minutes. Thereafter, the resulting mixture was taken out and sintered at about 600° C. for about 40 minutes, followed by sieving using an about −75 μm sieve to afford a coated carrier coated with the composite metal oxide of the foregoing composition in a film thickness of about 2 μm.

Comparative Example 1

The procedure of Example 1 was repeated except that the composite metal oxide used in Example 1 was substituted by the same amount of tin oxide and that the same amount of tin oxide was coated onto Cu—Zn ferrite particles having an average particle diameter of about 50 μm. The thus coated-carrier will hereinafter be referred to as the comparative carrier 1.

Comparative Example 2

A coated carrier was prepared in the same way as in Example 3 except that the composite metal oxide used in Example 3 was substituted by iron acetylacetonate and that a thin film of the iron acetylacetonate was formed on Cu—Zn ferrite particles having an average particle diameter of about 50 μm in the same manner as in Example 3. The thus-coated carrier will hereinafter be referred to as the comparative carrier 2.

The carriers obtained in the above Examples and Comparative Examples were measured for the amount of an electrostatic charge in the following manner. Using about 8.0 wt % of the following toner, based on the weight of the carrier, agitation was performed for a predetermined time with use of a remodeled bench of a developing machine A-Color 935 (a product of Fuji Xerox Co., Ltd.), followed by sampling. The measurement was conducted under high temperature-high humidity, medium temperature-medium humidity, and low temperature-low humidity conditions in accordance with a charge spectrography method. The results obtained are shown in Table 2.

[Toner for Measurement]

Linear Polyester Resin 100 wt %

(a linear polyester prepared from terephthalic acid/bisphenol A ethylene oxide adduct/cyclohexanedimethanol; Tg=62° C., Mn=4,000, Mw=35,000, acid value=12, hydroxyl value=25)

Magenta Pigment (C.I. Pigment Red 57) 3 wt %

The above components were mixed together in an extruder and then milled using a jet mill, followed by dispersion with a pneumatic classifier. The resulting magenta toner particles of $d_{50}$=8 μm were used.

TABLE 2

| | Agitation 10 min. (μC/g) | | | Agitation 60 min. (μC/g) | | |
|---|---|---|---|---|---|---|
| | High temperature-high humidity | Medium temperature-medium humidity | Low temperature-low humidity | High temperature-high humidity | Medium temperature-medium humidity | Low temperature-low humidity |
| Example 1 | −20.10 | −22.00 | −24.00 | −20.10 | −22.50 | −25.00 |
| Example 2 | −30.00 | −31.00 | −33.00 | −30.00 | −30.80 | −31.00 |
| Example 3 | −25.00 | −27.00 | −28.00 | −25.00 | −26.50 | −27.00 |
| Comparative Example 1 | −20.50 | −25.00 | −30.00 | −12.00 | −20.00 | −22.00 |
| Comparative Example 2 | −15.10 | −20.10 | −25.00 | −10.50 | −15.00 | −20.10 |

From the above results it is seen that the electrostatic charge regulators prepared according to the present invention can hold a certain amount of an electric charge when used as carriers for electrophotography.

Further, the electrostatic charge regulators according to the present invention were applied to a developer sleeve used in a non-magnetic mono-component developing method for electrophotography and evaluation was made in the following manner. As to the toner, there was used the same toner as that used in the above evaluation of carriers for electrophotography.

Developer Sleeve Example 1

The dispersion of the composite metal oxide in the polymeric binder described in the Electrostatic Charge Regulator Example 1 was applied to the surface of a developer roll sleeve (made of stainless steel) for a laser printer 4105 (a product of Fuji Xerox Co., Ltd.) by means of a dip coater to form a thin film having a thickness of about 5.0 μm, followed by vacuum drying at about 50° C. As a result, there was obtained a charging sleeve coated with a film of the composite metal oxide having a thickness of about 2.5 μm.

Developer Sleeve Example 2

About 0.5 g of carbon black particles (trade name: Vulcan XC72) having an average particle diameter of about 0.25 μm were added as a resistance control material to the dispersion of the composite metal oxide in the polymeric binder described in the Electrostatic Charge Regulator Example 2 and were dispersed for one hour by means of a sand mill. The resulting dispersion was then applied to the surface of the same roll sleeve as that used in the Developer Sleeve Example 1 by a dip coating method to form a coating layer having a thickness of about 2.5 μm, followed by drying at about 60° C. for about 30 minutes to afford a charging sleeve.

Developer Sleeve Comparative Example 1

As Comparative Example 1, the same roll sleeve as the one used in Developer Sleeve Example 1 was used as it was.

Developer Sleeve Comparative Example 2

Styrene/N,N-dimethylaminoethyl methacrylate (80/20 mol ratio) were applied onto the surface of the same roll sleeve as that used in Developer Sleeve Example 1 to form a coating layer about 2.5 μm thick on the sleeve. This coated sleeve will hereinafter be referred to as Comparative Example 2.

<Evaluation>

The sleeves obtained in Developer Sleeve Examples 1, 2 and Developer Sleeve Comparative Examples 1, 2 were each attached to a remodeled machine of a laser printer 4105 (a product of Fuji Xerox Co., Ltd.) and a continuos 10,000-sheet copying test was conducted. In this copying test, the amount of charge on the toner and charge distribution on each developer sleeve were checked at every completion of copying of about 100 sheets, about 1,000 sheets, and about 10,000 sheets in accordance with charge spectrography. There were obtained such results as shown in Table 3 below.

TABLE 3

| | Amount of charge after copying 100 sheets (μC/g) | Amount of charge after copying 1,000 sheets (μC/g) | Amount of charge after copying 10,000 sheets (μC/g) | Charge Distribution (after copying 10,000 sheets) |
|---|---|---|---|---|
| Example 1) | −15.0 | −14.0 | −13.0 | Narrow No opposite-pole toner |
| Example 2) | −17.0 | −15.5 | −15.0 | Narrow No opposite-pole toner |
| Comparative Example 1) | −20.0 | −15.5 | −10.0 | Wide Much opposite-pole toner |
| Comparative Example 2) | −22.0 | −10.0 | −7.0 | Wide Much opposite-pole toner |

From the above results it is seen that when the composite metal oxide according to the present invention is applied to a developer sleeve in a non-magnetic mono-component developing method for electrophotography, a certain electric charge can be held over a long time in comparison with the conventional developer sleeves.

Further, when the composite metal oxide according to the present invention was used as a transfer belt for electrophotography, evaluation was made in the following manner.

Transfer Belt Preparation Example

About 30 parts by weight of the composite metal oxide used in Example 1 was dispersed in about 70 parts by weight of a capton polyimide resin and the resulting dispersion was kneaded and dehydrated with the corresponding polyamic acid resin, then the resulting mixture was subjected to extrusion and biaxial stretching to form a film.

The film was then evaluated by a charging current/charge quantity measuring method and a change in surface potential was measured. The film exhibited an abrupt rise of current value at a surface potential of about −15 V. There was no change in surface potential. Thus, it turned out that the film functioned effectively as an electrostatic charge regulator.

The film was then loaded onto a remodeled bench of the developing machine A-Color 935 and a developing transfer test was conducted. The amount of charge on the toner transferred onto a magnet roller in the developing machine and also onto the film, as well as charge distribution, were measured. It turned out that there was no difference between the amount of charge on the toner developed and that on the toner present on the transfer film and that there was a sharp charge distribution.

In contrast therewith, when there was used a transfer film formed using carbon black as a resistance material, the amount of the toner developed decreased on the transfer film and the charge distribution became wide.

Where the electrostatic charge regulator in one aspect of the present invention is used for electrophotography in which static electricity is utilized positively, an electrostatic charge generated on a substance surface can be controlled to a desired quantity and it is possible to ensure the performance which permits image deterioration to be remedied and stability improved to a great extent which deterioration in image and stability has been a problem to be solved in the conventional electrophotographic method.

According to the method of making the electrostatic charge regulator in another aspect of the present invention it is possible to produce the electrostatic charge regulator in a stable manner.

According to the image forming method in a further aspect of the present invention it is possible to obtain a stable image free of image deterioration.

What is claimed is:

1. An electrostatic charge regulator, comprising:

a base member; and a surface layer containing a non-linear resistor, the surface layer is formed on the base member by using a combination of a composite metal oxide including at least one metal selected from a Group A metal (Zn, Ti, Si, Al, Zr) and at least one metal selected from a Group B metal (Bi, Sb, C, Y, La, Pr, Sc, Ce, Sn, Pb), wherein a threshold voltage of the non-linear resistor exerts an influence on the electrostatic charge regulator.

2. The electrostatic charge regulator according to claim 1, wherein the threshold voltage of the non-linear resistor is about 1.0 to 20,000 V.

3. The electrostatic charge regulator according to claim 1, wherein the threshold voltage of the non-linear resistor is about 1.0 to 400 V.

4. The electrostatic charge regulator according to claim 1, wherein the non-linear resistor indicates a resistor whose electric resistance varies non-linearly against an applied voltage.

5. The electrostatic charge regulator according to claim 1, wherein the composite metal oxide further includes at least one metal selected from a Group C metal (Mg, Ca, Sr, Ba, Co, Mn, Ni, Cu, Fe, V).

6. The electrostatic charge regulator according to claim 1, wherein the composite metal oxide is formed on a carrier, a developer sleeve, a developer blade or a transfer belt.

7. The electrostatic charge regulator of claim 1, wherein the surface layer is formed over the base member by forming a thin film of the composite metal oxide.

8. The electrostatic charge regulator of claim 1, wherein the surface layer is formed over the base member by using a dispersion of powder of the composite metal oxide in a high molecular compound.

* * * * *